United States Patent [19]

Mayumi et al.

[11] 4,263,249

[45] Apr. 21, 1981

[54] METHOD FOR PRODUCING REINFORCED PLASTIC TUBULAR BODY HAVING ANNULAR GROOVES, AND MOLD THEREFOR

[75] Inventors: Masakatu Mayumi, Osaka; Kenji Mitooka; Sigeharu Fujiwara, both of Okayama; Takesi Okuyama, Kyoto, all of Japan

[73] Assignee: Sekisui Kagaku Kogyo Kabushiki Kaisha, Osaka, Japan

[21] Appl. No.: 52,915

[22] Filed: Jun. 26, 1979

[30] Foreign Application Priority Data

Jun. 28, 1978 [JP] Japan ................................ 53-78967

[51] Int. Cl.³ ............................................. B28B 7/06
[52] U.S. Cl. ...................................... 264/334; 249/63; 249/144; 249/151; 249/183; 249/184; 264/313; 264/316; 264/336
[58] Field of Search ................. 249/63, 144, 151, 183, 249/184; 264/313, 316, 336, 334

[56] References Cited

U.S. PATENT DOCUMENTS

| | | | |
|---|---|---|---|
| 3,962,394 | 6/1976 | Hall | 264/257 |
| 3,988,103 | 10/1976 | Hoffmeister | 249/184 |
| 4,113,828 | 9/1978 | Kramer | 264/336 |

OTHER PUBLICATIONS

Japanese Laid-Open Utility Model Publication, No. 48-100863, Nov. 28, 1973.

*Primary Examiner*—Paul R. Michl
*Attorney, Agent, or Firm*—Wenderoth, Lind & Ponack

[57] ABSTRACT

A mold for the production of a reinforced plastic tubular body having an annular groove such as a pipe coupling, the mold having a mold body and detachably mounted on a predetermined position thereof, an annular groove former consisting of a surface layer of an elastic material and a core covered with the surface layer. The reinforced plastic tubular body is produced by forming a layer of a molding material around the aforesaid mold, curing the layer of molding material, separating the mold body from the cured layer of molding material, and then separating the annular groove former from the cured layer of molding material by removing the core and then removing the surface layer.

11 Claims, 7 Drawing Figures

METHOD FOR PRODUCING REINFORCED PLASTIC TUBULAR BODY HAVING ANNULAR GROOVES, AND MOLD THEREFOR

This invention relates to a method for producing reinforced plastic tubular bodies having annular grooves for securing packings or lock rings, such as rubber ring-type pipe couplings, and to a mold therefor.

The invention will be described in detail hereinbelow with reference to the accompanying drawings in which.

Figure 7:
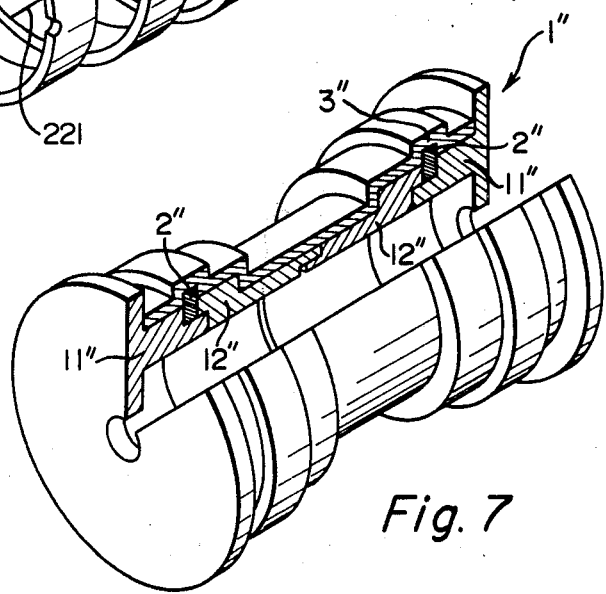
FIG. 7 is a partly broken-away perspective view illustrating a conventional molding method.

A known conventional method for producing plastic tubular articles of this kind, as shown in FIG. 7, comprises splitting a mold 1″ into an outer mold member 11″ and an inner mold member 12″ at a part at a point at which an annular groove is to be forme in the molded material, making the inner part of the outer mold member 11″ smaller in diameter, fitting a groove former 2″ on the smaller-diameter part, holding it on the outer mold member 11′ by the inner mold member 12″ by assembling the mold, wrapping a molding material around it to form a molding material layer 3″, curing the molding material layer 3″, removing the outer mold member 11″, removing the groove former 2′ by moving it inwardly toward the space within the resulting molded pipe, and then removing the inner mold member 12″. The groove former 2″ is, for example, and annular structure which is made of an elastic material such as rubber or synthetic resin, or an annular structure made of a hard material such as metal and split so that it can be pulled toward the space within the resulting plastic tubular body. When the annular structure made of a hard material is used as the groove former 2″, the accuracy of the shape of the annular groove is excellent, but difficulties are encountered in separating the peripheral surface of the groove former from the surface of the annular groove. Specifically, at an early stage of separating the groove former, it must be pulled in a direction perpendicular to the groove surface, and the two side surfaces of the groove former must always be separated in the shearing direction. Accordingly, even if the molding surface of the groove former has been subjected to mold-release treatment, it is extremely difficult to pull away the groove former. The use of a soft material, on the other hand, has the defect that the accuracy of the shape of the annular groove is reduced.

It is an object of this invention to provide a mold and a molding method which overcome the aforesaid defects of the prior art technique, which can permit easy removal of a groove former, and which can produce reinforced plastic tubular bodies having annular grooves of superior shape and dimensional accuracy.

As a mold which achieves the above object, the present invention provides an assembly comprising a mold body and detachably mounted on predetermined parts of the mold body, an annular groove former composed of a surface layer of an elastic material and a core covered by the surface layer.

The invention also provides a method for producing a reinforced plastic tubular body having annular grooves, which comprises forming a layer of a molding material around the aforesaid assembly, curing the layer of molding material, then separating the mold body from the cured molding material layer, and removing the core and then removing the surface layer to separate the annular groove former from the cured molding material layer.

Some embodiments of the present invention are described below with reference to FIGS. 1 to 6.

The parts of a mold body for producing a pipe coupling having annular grooves are shown at 1 and 1′. The mold body parts 1 and 1′ can be secured to a support shaft 3 by clamping means 4 and 4′. The mold body parts 1 and 1′ respectively have a larger diameter at end portions 12 and 12′ than at centeral portions 11 and 11′. A recess 111 is provided at the inner periphery of the end of the central portion 11, and a mating recess 111′ is provided at the outer periphery of the end of the central portion 11′. These recesses 111 and 111′ are adapted to fit together at the time of assembling the parts to from the mold. Collars 13 and 13′ are provided respectively at the outer side edges of the end portions 12 and 12′.

Figure 5:
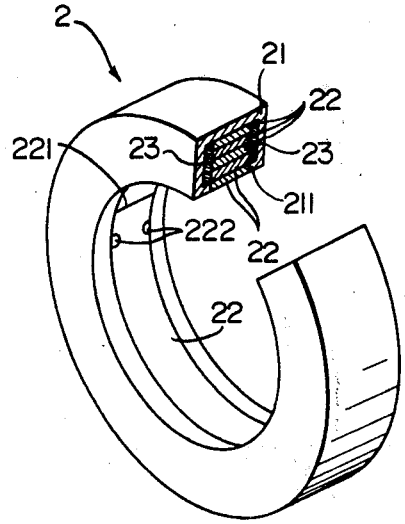

An annular groove former is shown at 2, and its outside surface has a shape conforming to the shape of the inside surface of the annular groove to be formed in the molded tubular body. The annular groove former 2 consists of a thin surface layer 21 made of an elastic material such as rubber and a core covered by the surface layer 21. The core is an assembly of thin elements 22 stacked concentrically. If desired, the core may be made of a single element instead of an assembly of such elements. The surface layer 21 is an annular structure having a trapezoidal or U-shaped cross section (see FIGS. 3 and 4), or an annular structure having both ends further bent inwardly to form flanges 211 (FIG. 5). A mold-release layer such as a film of polyvinyl alcohol is provided on the outside surface of the surface layer. The mold-release layer may be a layer of silicone rubber, or the entire surface layer 21 may be made of silicone rubber. Each of the elements 22 constituting the core is an annular structure having one recess 221 and optionally, a small hole 222. At least one of these elements, especially the innermost element, may be magnetic (for example, made of an elastic material containing a magnetic material). If the mold body parts 1 and 1′ are made of metal, such a core element can be fixed easily to a desired position on the mold body parts.

Figure 6:
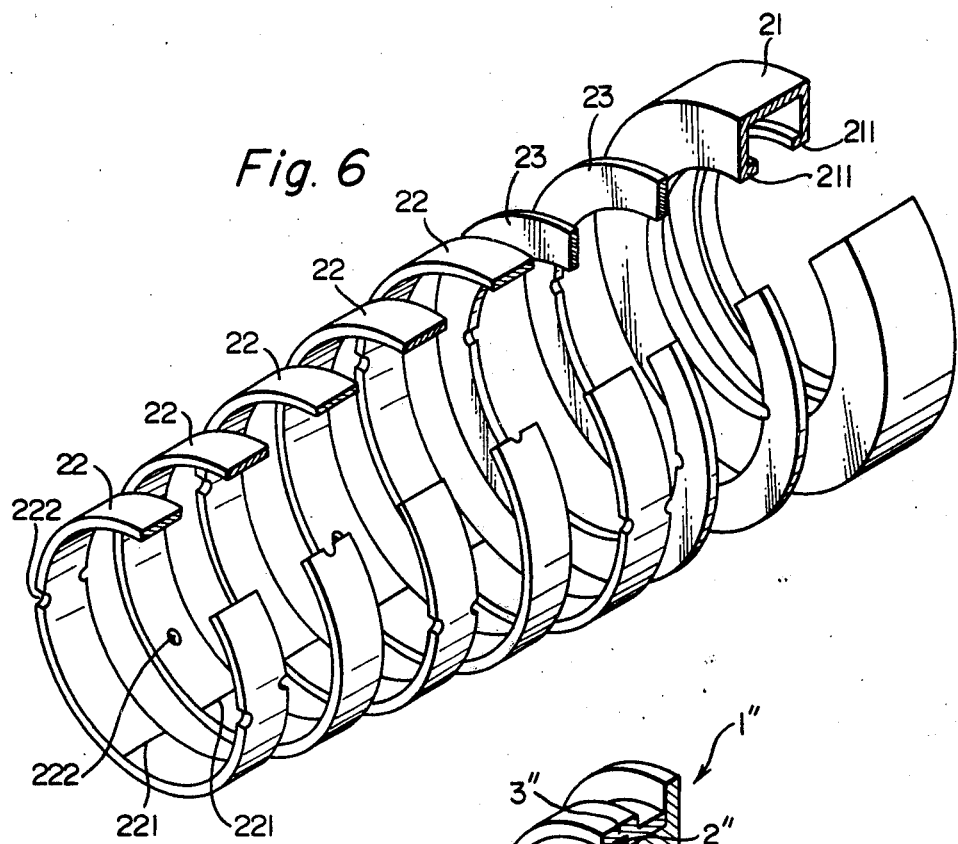
FIG. 6 is a partly broken-away perspective view showing the groove former in FIG. 5 before assembling.

The annular groove former 2 shown in FIG. 5 is made, as shown in FIG. 6, by fitting elements 22 successively (from right to left in the drawing) into the space surrounded by the surface layer 21. If required, auxiliary cores 23 may be used. Then, the annular groove former 2 is mounted on a predetermined position of the end portions 12 and 12′ of the mold body parts 1 and 1′, and the mold body parts are clamped to support shaft 3 by clamping means 4. Thus, a mold for the production of a reinforced plastic pipe coupling having internal annular grooves in accordance with this invention is formed. This mold can be disassembled by separating the annular groove formers 2 from the mold body parts 1 and 1', and successively separating the elements 22 from the surface layer 21. For ease of assembling and disassembling, the elements 22 are preferably made of an elastic material such as metal, plastics and rubbers.

The method of this invention is practiced in the following manner using the mold described hereinabove.

Figures 1, 2:
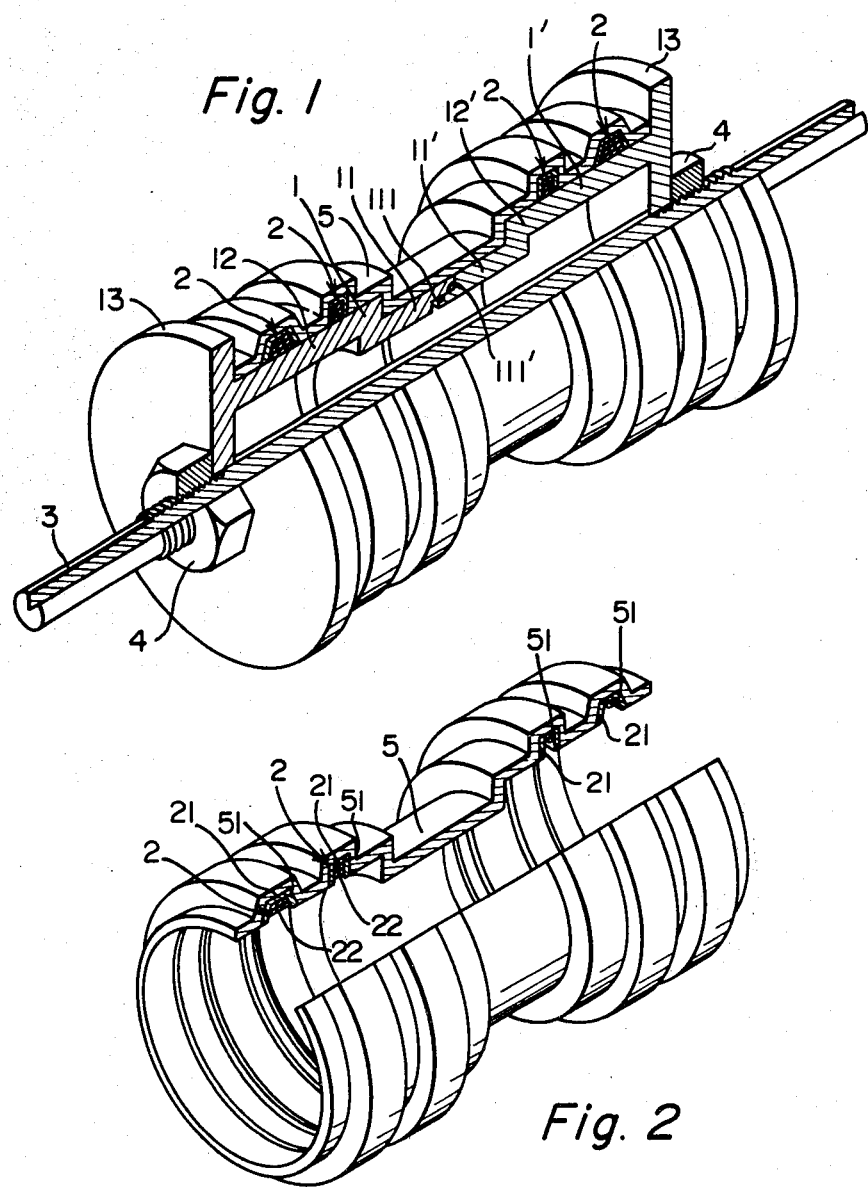
FIG. 1 is a partly broken-away perspective view for illustrating the first half of the molding method of this invention according to one embodiment of the invention.
FIG. 2 is a partly broken-away perspective view for illustrating the second half of the molding method of this invention according to the above embodiment.
Figure 3:
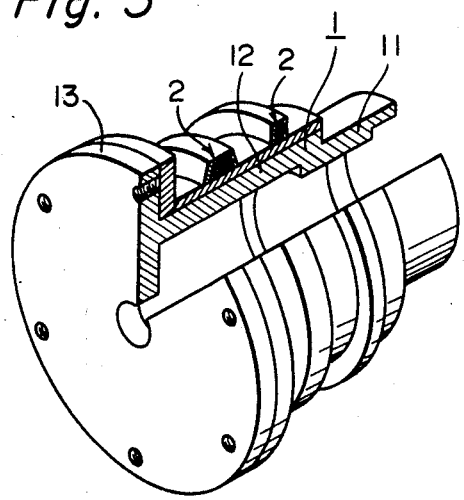
FIG. 3 is a partly broken-away perspective view showing a part of an embodiment of the mold of this invention.
Figure 4:
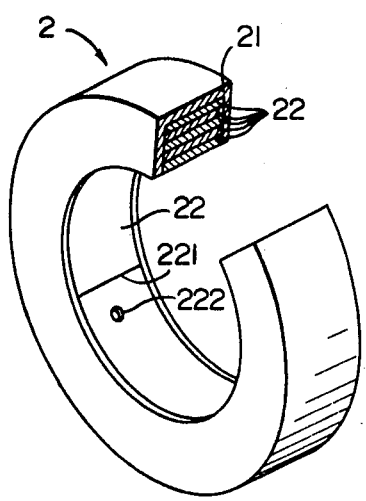
FIGS. 4 and 5 are partly broken-away perspective views showing groove formers assembled for use in the mold of this invention.

First, the mold is produced by mounting annular groove formers 2 consisting of a surface layer 21 of an elastic material and a core composed of an assembly of concentrically stacked elements 22 (the core may consist of a single element as stated hereinabove) at predetermined positions on the mold body parts 1 and 1'. A molding material, for example obtained by impregnating a mat or sheet of glass fibers with a soltuion containing an unsaturated polyester resin and a curing agent, is wrapped around the mold to form a layer 5 of the molding material which is then cured (FIG. 1). Then the mold body parts 1 and 1' are removed from within the cured product, and the groove former 2 remains in an annular groove 51 formed in the inside surface of the mold material layer 5 (FIG. 2). Then, the elements 22 are successively removed by inserting a pointed tool into the recesses 221 or small holes 222 beginning with the innermost element 22. Finally, the surface layer 21 is removed from the groove surface by peeling it away therefrom thereby to separate the annular groove former 2 from the inner surface of the annular groove 51. Thus, a reinforced plastic pipe coupling having annular grooves in its inner surface is obtained.

Since the method for producing a reinforced plastic tubular body in accordance with this invention involves mounting an annular groove former consisting of a surface layer of an elastic material and a core covered with the surface layer at predetermined positions of mold body parts, forming a layer of a molding material around the resulting assembly and then curing the molding material layer, an annular groove having a desired shape and superior dimensional accuracy can be formed. Furthermore, since the annular groove former is separated after the removal of the mold body parts by disassembling the groove former successively into its constituent elements, the annular groove former can be easily separated from the resulting annular groove. Accordingly, the molding can be performed with good efficiency.

The mold for the production of reinforced plastic tubular bodies in accordance with this invention consists of a mold body and detachably mounted at a predetermined position thereof, an annular groove former composed of a surface layer of an elastic material and a core covered with the surface layer. Accordingly, after a molding material layer is formed on the mold and cured, the annular groove former can be easily separated from the resulting annular groove by disassembling it. A reinforced plastic tubular body having the desired shape and superior dimensional accuracy can thus be provided advantageously.

What we claim is:

1. A method for producing a plastic tubular body having a molded annular groove on the inner surface thereof, which comprises:

mounting an annular groove former consisting of a surface layer of an elastic material and a core covered with the surface layer at a predetermined position on a mold body;

forming a layer of a molding material around the resulting assembly;

curing the layer of molding material;

removing the mold body from within the curved tubular layer of molding material while leaving the annular groove former in place in the cured tubular layer;

then removing the core of the annular groove former from within the surface layer; and finally removing the surface layer from within the groove in the cured molding material.

2. A mold for the production of a plastic tubular body having a molded annular groove in the inner surface thereof, said mold comprising: a mold body and an annular groove former detachably mounted at a predetermined position thereon, said groove former consisting of a surface layer of an elastic material and a core covered by said surface layer.

3. A mold as claimed in claim 2 in which said surface layer has a radially inwardly facing annular opening therein through which said core can be removed after the mold body is removed from within said groove former after a plastic material has been molded around said mold.

4. A mold as claimed in claim 3 in which said surface layer has inwardly directed spaced opposed edges on the radially inner periphery thereof, the space between said edges defining said opening.

5. A mold as claimed in claim 4 in which said core consists of a plurality of concentrically arranged elements.

6. A mold as claimed in claim 5 in which said core further comprises a pair of auxiliary core members within said surface layer and radially aligned with said inwardly directed edges.

7. A mold as claimed in claim 5 in which at least one of said elements is made of a magnetic material.

8. A mold as claimed in claim 3 in which said core has at least one recess therein which is engageable by a tool for removing said core from within said surface layer.

9. A mold as claimed in claim 2 in which said surface layer has a mold release layer on the outside surface thereof.

10. A mold as claimed in claim 2 in which said surface layer is constituted of a mold release material.

11. A mold as claimed in claim 2 in which said surface layer is made of silicone rubber.

* * * * *